Dec. 12, 1961   D. E. WAITE   3,012,802
HIGH TEMPERATURE SEAL
Filed Dec. 4, 1958

INVENTOR
DAVID E. WAITE
BY *Scrivener & Parker*
ATTORNEYS

United States Patent Office 3,012,802
Patented Dec. 12, 1961

3,012,802
HIGH TEMPERATURE SEAL
David E. Waite, Bristol, Conn., assignor to Associated Spring Corporation, Bristol, Conn., a corporation of Connecticut
Filed Dec. 4, 1958, Ser. No. 778,193
1 Claim. (Cl. 288—31)

This invention relates to sealing means for pipes, couplings, joints and the like and, more particularly, to sealing means for preventing the escape of high temperature gases through the connection between two aligned tubes or pipes such as those used under high temperature conditions, such as in jet aircraft.

It is the principal object of this invention to provide a seal for use in association with connection between two aligned pipes or tubes which conduct gases or liquids at high temperature, which will eliminate or reduce to a minimum the leakage through the connection. A further object has been to provide a resilient sealing means which is normally compressed when in use whereby its sealing effect is increased by providing a very tight connection and, in addition, by reason of which it may expand to compensate for changes in the dimensions of the associated parts due to large increases in the temperature at which such parts are operated. A still further object of the invention has been to provide a metal seal comprising a number of similarly shaped parts which cooperate to produce a sealing effect which is much more efficient and effective than would be provided by a single sealing member.

The invention is described in the following specification and is illustrated in the accompanying drawing, in which.

In many aircraft and industrial applications it is often necessary to transmit very hot gases or liquids through pipes or tubes, or it is often necessary to transmit gases or liquids through tubes which are subject to high ambient temperatures. In either case the pipes or tubes will expand and contract with wide variations in temperature, thus varying the size of the opening between them and thus, also, making it necessary to provide sealing means at the connection to prevent escape of gas or liquid between aligned sections. By this invention I have provided an improved sealing means for effecting this and for compensating for any dimensional changes in the connected sections of the conduit, thus preserving the efficiency and effectiveness of the sealing means.

Figure 1:
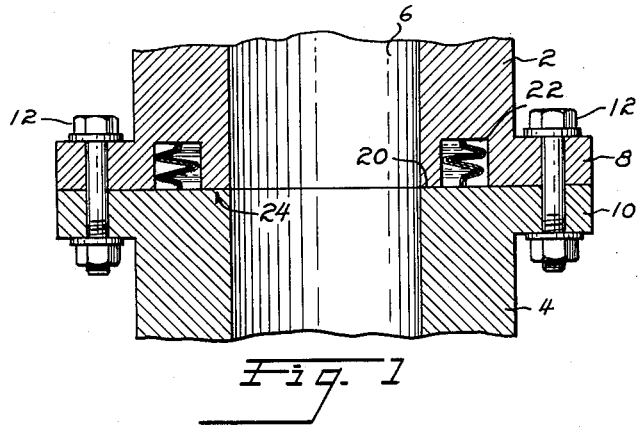
FIG. 1 is a sectional view through two aligned tubes or pipes showing a sealing means according to the invention.

In FIG. 1 of the drawing there are disclosed two aligned sections 2, 4 of a conduit such as a pipe, tube or the like, these sections having an aligned passage 6 therethrough for the transmission of a gas or liquid at high temperature. The sections 2, 4 are provided, respectively, with external annular flanges 8, 10 which are connected by an annular series of bolts 12 thereby to rigidly connect the two conduit sections. One of these sections, such as section 2, is provided in its end 20, adjacent conduit section 4, with an annular recess 22 which is so positioned that it is closed by the end face 24 of the conduit section 4 when the two conduit sections are connected together.

Figure 2:
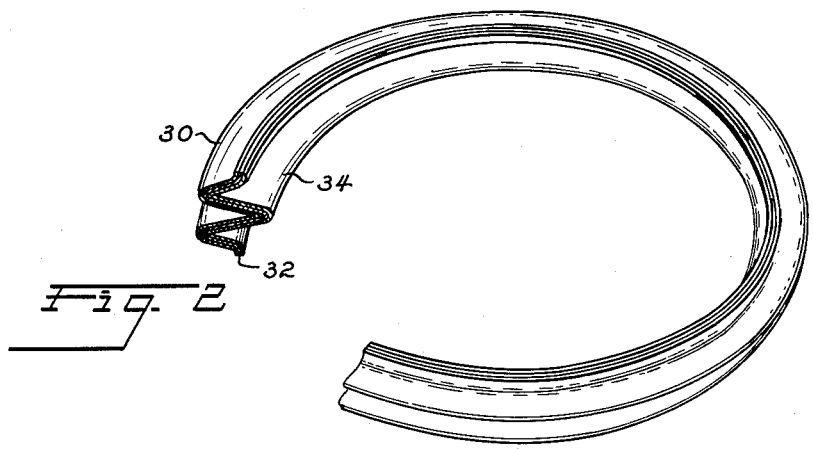
FIG. 2 is a perspective view, with a part broken away, of a sealing device according to the invention.
Figure 3:
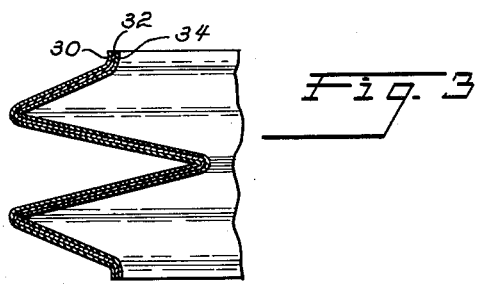
FIG. 3 is an enlarged sectional view through the sealing means disclosed in FIGS. 1 and 2.

In accordance with this invention a sealing means of new and improved construction is disposed within the annular recess 22. The sealing means is shown in FIG. 1 in position within recess 22 and in perspective and sectional views are shown in FIGS. 2 and 3, respectively.

The sealing means comprises an annular ring-shaped body formed of a plurality of annular, concentric members 30, 32, 34 which are of similar wave shape in cross section and which are nested together to form an essentially unitary structure. There are preferably three of these rings although a greater or less number may be provided. Each ring is formed of sheet metal having some resilience when formed into the described shape and it has been found that very satisfactory results may be achieved by forming the rings of Inconel X. The ends of each ring are welded or otherwise suitably connected and there is preferably no connection between the separate rings.

In the use and operation of a sealing means according to the invention the concentric, similarly shaped rings are nested together to form an essentially unitary, annular structure which is wave shaped in cross section. This annular member is placed within the annular recess 22 before the two conduit sections 2, 4 are brought together. The axial dimension of the annular sealing device in its free state is greater than the depth of the recess 22, and when the end faces 20, 24 of the two conduit sections are brought together in face-to-face abutment the annular sealing device will be axially compressed and will therefore tightly engage the bottom wall of the recess and the end face 24 of the conduit section 4, thus effectively preventing any escape of gas or liquid from the passage 6 between the end surfaces 20, 24 of the conduit sections. Because of the axial compression of the sealing means when it is in position it may expand axially with any increase in the dimensions of one or both of the conduit members 2, 4, thus compensating for any such change and thereby maintaining an efficient and effective seal. The provision of a plurality of concentric rings increases the sealing action and also gives added strength to the assembly.

While I have described and illustrated one form which my invention may take it will be apparent to those skilled in the art that other embodiments, as well as modifications of that disclosed, may be made and practiced without departing in any way from the spirit or scope of the invention, for the limits of which reference must be made to the appended claim.

What is claimed is:

A resilient sealing device adapted and intended to be disposed within an annular axially extending recess formed in the end of one of two aligned connected conduit sections, said sealing device having an open-wave form in cross-section and comprising a plurality of substantially identical concentric abutting and nested annular members which are regularly corrugated in an axial direction to provide open, axially-spaced, non-abutting integral segments, each of said members being formed of resilient sheet metal, the free axial length of the sealing device being greater than the axial dimension of the recess in which the sealing device is adapted and intended to be placed, whereby the sealing device will be resiliently compressed in an axial direction when placed in such recess and the end surfaces of the conduit sections are brought together, the segments adapted to remain spaced in use.

References Cited in the file of this patent
UNITED STATES PATENTS

| | | |
|---|---|---|
| 147,498 | Henderson | Feb. 17, 1874 |
| 1,543,963 | Walton | June 20, 1925 |
| 2,452,469 | Johnson | Oct. 26, 1948 |
| 2,783,295 | Ewing | Feb. 26, 1957 |

FOREIGN PATENTS

| | | |
|---|---|---|
| 610,973 | France | Sept. 17, 1926 |
| 614,140 | Germany | June 3, 1935 |